UNITED STATES PATENT OFFICE.

ALFRED A. WELLS, OF CALDWELL, NEW JERSEY, ASSIGNOR TO ELLIS-FOSTER COMPANY, A CORPORATION OF NEW JERSEY.

COUMARONE-RESIN INSULATING MATERIAL.

1,332,860. Specification of Letters Patent. Patented Mar. 2, 1920.

No Drawing. Application filed April 9, 1917. Serial No. 160,745.

*To all whom it may concern:*

Be it known that I, ALFRED A. WELLS, a citizen of the United States, residing at Caldwell, in the county of Essex and State of New Jersey, have invented certain new and useful Improvements in Coumarone-Resin Insulating Material, of which the following is a specification.

This invention relates to insulating compositions and relates particularly to products containing coumarone resin.

Coumarone resin is a body physically resembling many ordinary resins but differing from most resins by its being of a substantially hydrocarbon nature or at least of an unsaponifiable character so as to be relatively unaffected by alkali, acids and the like, which have a pronounced action especially on the softer forms of ordinary resins or those consisting largely of acid bodies.

The present invention has to do particularly with coumarone resin incorporated with fibrous material such as asbestos or even vegetable fiber such as cotton to form molded compositions or other suitable insulating compositions or coatings adapted for electrical purposes. Thus, base boards, buttons, switch holders, insulators for wires and for holding wires on poles or walls including insulators of the petticoat type, may be prepared employing coumarone resin as an essential ingredient.

For example the coumarone resin may be dissolved in a suitable solvent such as benzol, admixed with asbestos, dried and heated, and then molded under high pressure into the shape required. With the coumarone may be incorporated various substances such as shellac, asphalt and other resins on which the coumarone resin appears to have a beneficial influence by assisting to prevent destructive oxidation and action of the elements. The proportion of coumarone resin may be varied in such insulating materials from very small to quite large proportions depending upon the degree of resistance or other physical qualities required.

Coumarone resin may be obtained of different melting points and degrees of plasticity so that for different applications various grades may be selected and used to advantage depending upon the particular requirements in hand.

Mixtures of approximately equal parts of shellac and coumarone constitute a suitable basis for incorporating with filling and extending ingredients.

A suitable composition for cheap insulation may be prepared by dissolving 12 parts by weight of asphalt with 1 to 5 parts of coumarone resin in benzol and incorporating asbestos fiber in this mixture to make a stiff paste. The solvent is removed by evaporation and the mass then heated and pressed. It forms a very dense firm mass which is not readily susceptible to the action of moisture. On adding a large proportion of coumarone resin the qualities of the mass are duly modified thereby.

In a similar manner shellac and coumarone may be dissolved using a solvent in which both may be put into solution, for example, mixtures of solvents such as hydrocarbons, alcohol or ketone compositions which are good for the purpose. The solution is applied to the fibrous material employed.

A variety of other resins including the copals, ordinary rosin and tars, pitches and similar fusible bodies, also, in some cases, rubber or rubber composition and rubber substitutes, which, however, are not very good insulators and various waxes may be incorporated in the mass as required for certain cases or special purposes.

What I claim is:—

1. An insulating composition comprising coumarone resin and asbestos fiber.
2. An insulating composition comprising coumarone resin, asbestos fiber and other extending material.
3. An insulating composition comprising coumarone resin incorporated with plastic insulating material, asbestos fiber and extending material.
4. An insulating material comprising coumarone resin, resinous bodies and asbestos material.
5. A molded electric insulator containing coumarone resin as an essential constituent.
6. A molded electric insulator containing paracoumarone, and another resin, together with a fibrous filling material.
7. A molded electric insulator comprising coumarone resin and fibrous material.
8. A molded electric insulator comprising coumarone resin admixed with other resinous material.
9. A molded electric insulator containing coumarone resin and filling material.

ALFRED A. WELLS.